US008984542B2

(12) United States Patent
Adams et al.

(10) Patent No.: US 8,984,542 B2
(45) Date of Patent: Mar. 17, 2015

(54) METHOD AND SYSTEM FOR BINDING OBJECTS IN DYNAMIC PROGRAMMING LANGUAGES USING CACHING TECHNIQUES

(71) Applicant: Facebook, Inc., Menlo Park, CA (US)

(72) Inventors: Keith Adams, San Carlos, CA (US); Andrew John Paroski, San Francisco, CA (US); Jason Owen Evans, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 243 days.

(21) Appl. No.: 13/691,664

(22) Filed: Nov. 30, 2012

(65) Prior Publication Data
US 2014/0157291 A1   Jun. 5, 2014

(51) Int. Cl.
*G06F 9/45* (2006.01)
*G06F 9/445* (2006.01)

(52) U.S. Cl.
CPC .............. *G06F 9/44521* (2013.01); *G06F 8/41* (2013.01)
USPC ............................ 719/332; 719/331; 717/148

(58) Field of Classification Search
USPC .................................. 719/331, 332; 717/868
See application file for complete search history.

(56) References Cited

U.S. PATENT DOCUMENTS 5,615,400 A *   3/1997  Cowsar et al. ................. 719/332
6,446,259 B2 *  9/2002  Brett .............................. 717/165
6,862,728 B2 *  3/2005  Darnell et al. ................. 717/148
2003/0014555 A1 *  1/2003  Cierniak ........................ 709/315
2004/0255268 A1 * 12/2004  Meijer et al. .................. 717/106
2008/0282260 A1 * 11/2008  Bozza et al. ................... 719/315
2010/0306739 A1 * 12/2010  Schneider ...................... 717/116

OTHER PUBLICATIONS

Benda, J.; Matousek, T.; Prosek, L., "Phalanger: Compiling and Running PHP Applications on the Microsoft .NET Platform" (2006), Proceedings of the 4th International Conference on .NET Technologies, pp. 11-22 [retrieved from http://v1.php-compiler.net/Papers/DotNetTechnologies.pdf].*

Biggar, P.; Vries, E.; Gregg, D., "A practical solution for scripting language compilers" (Mar. 2009), 24th Annual ACM Symposium on Applied Computing, pp. 1-8 [retrieved from http://dl.acm.org/citation.cfm?id=1529709].*

(Continued)

*Primary Examiner* — Brian W Wathen
(74) *Attorney, Agent, or Firm* — Perkins Coie LLP

(57) ABSTRACT

Disclosed are a method and system for binding a program object in a source code to one of a number of implementations of the program object, using caching techniques. Binding a program object to a particular implementation includes performing the binding process at compile time and runtime of the source code. During compilation phase, the program objects in the source code are identified, and each of the program objects is assigned a slot in a target cache. The slot is configured to store a pointer that points to a particular implementation of a program object to which the slot is assigned. During execution phase, the particular implementation of the program object is determined based on execution flow of the source code. After the particular implementation is determined, the program object is bound to the particular implementation by updating the assigned target cache slot with a pointer pointing to the particular implementation.

19 Claims, 6 Drawing Sheets

(56) References Cited

OTHER PUBLICATIONS

Zhao, H.; Proctor, I.; Yang, M.; Qi, X.; Williams, M.; Gao, Q.; Ottoni, G.; Paroski, A.; MacVicar, S.; Evans, J.; Tu, S., "The HipHop compiler for PHP" (Oct. 2012), ACM SIGPLAN Notices—OOPSLA '12,vol. 47 Issue 10, pp. 575-586 [retrieved from http://dl.acm.org/citation.cfm?id=2384658].*

Wikipedia, "HipHop for PHP" (Nov. 22, 2010), pp. 1-3 [retrieved from http://en.wikipedia.org/w/index.php?title=HipHop_for_PHP&oldid=398315886].*

* cited by examiner

```
{
IF (isItMyLuckyDay ( )) {
    function doubleMyMoney ($num) {        ⎫
        return $num * 2                     ⎬  first implementation
    }                                       ⎭        205
}
ELSE {
    function doubleMyMoney ($num) {        ⎫
        return $num * 0.5                   ⎬  second implementation
    }                                       ⎭         210
} doubleMyMoney (2,000,000) ;   ⎱  method call
...                            ⎰      215

METHOD AND SYSTEM FOR BINDING OBJECTS IN DYNAMIC PROGRAMMING LANGUAGES USING CACHING TECHNIQUES

FIELD OF INVENTION

This invention generally relates to binding objects in dynamic programming languages. More specifically, the invention relates to binding objects to their implementations using caching techniques.

BACKGROUND

In computer related technologies, certain programming languages provide a feature such as late binding. Late binding is a mechanism in which, for example, a method being called upon an object is looked up by name at runtime. In programming languages with early binding, a compiler can statically verify that there are one or more methods with the appropriate method name and signature. However, with late binding, the compiler does not have enough information to even verify if the called method exists. For example, certain programming languages allow a method to have multiple implementations, one of which is selected based on a condition specified in the source code. However, the condition is evaluated only at runtime during execution of the source code. So, the compiler does not know which implementation a method call is referring to until the source code is executed.

Prior art techniques use a data structure such as hashtable to store a mapping of a method name to its implementation. The mapping is stored as a key-value pair of method name and a pointer to the method's implementation. During the execution of the program, when the method is called upon, the hashtable is looked up by the method name and a pointer to the method implementation is obtained.

Maintaining and using a hashtable, especially at runtime, consumes a significant amount of computing resources. As the number of methods (or other objects that are supported for late binding) in the source code increases, the hashtable size increases and therefore, has an adverse impact on runtime memory. Further, performing a look up in the hashtable for every method call consumes a significant amount of time causing an adverse impact on the execution speed of the program.

SUMMARY

Introduced here are a method and system for binding a program object in a source code of a program to an implementation of the program object, using caching techniques. A program object includes programming language constructs such as a class, a method, a variable, a constant, etc. The program object can have a number of implementations or definitions defined in the source code. For example, a variable can have a number of definitions, a method can have a number of implementations etc. Executing a particular implementation, after the particular implementation is selected based on the execution flow of the source code, is achieved by binding the program object to the particular implementation. The binding of a program object to a particular implementation of the program object is performed at different phases of the program. A part of the binding process is performed during compilation of the source code and the rest is performed during execution of the source code.

During compilation phase, the program objects in the source code are identified, and each of the program objects is assigned a slot in a target cache. The target cache is a data structure in a cache memory having a set of contiguous slots. The slot is configured to store, upon execution of the source code, a pointer that points to a particular implementation of the program object to which the slot is assigned.

During the execution phase, a particular implementation of the program object, to be executed upon invocation of the program object, is selected based on execution flow of the source code. After the particular implementation is selected, the program object is bound to the particular implementation by updating the assigned slot in the target cache with a pointer pointing to the particular implementation. When the program object is invoked during the execution of the program, the particular implementation of the program object to be executed is determined by looking-up the slot in the target cache assigned to the program object. The particular implementation is loaded into the execution sequence and executed.

Using a cache for binding program objects to their implementations has better performance over prior art binding techniques. The execution speed of the program is enhanced, and the consumption of computing resources is also reduced compared to the prior art techniques.

Some embodiments of the invention have other aspects, elements, features, and steps in addition to or in place of what is described above. These potential additions and replacements are described throughout the rest of the specification.

BRIEF DESCRIPTION OF THE DRAWINGS

FIG. 2 illustrates an example source code written using a dynamic programming language.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed are a method and system for binding a program object in a source code of a program to an implementation of the program object, using caching techniques. A program object includes programming language constructs such as a class, a method, a variable, a constant, etc. The program object can have a number of implementations or definitions defined in the source code. For example, a variable can have a number of definitions, global constants can have number of values defined, a method can have a number of implementations etc. Executing a particular implementation, after the particular implementation is selected based on the execution flow of the source code, is achieved by binding the program object to the particular implementation. The binding of a program object to a particular implementation of the program object is performed at different phases of the program. A part of the binding process is performed during compilation of the source code and the rest is performed during execution of the source code.

During compilation phase, the program objects in the source code are identified, and each of the program objects is assigned a slot in a target cache. The target cache is a data structure in a cache memory having a set of contiguous slots. The slot is configured to store, upon execution of the source code, a pointer that points to a particular implementation of the program object to which the slot is assigned.

During the execution phase, a particular implementation of the program object, to be executed upon invocation of the program object, is selected based on execution flow of the source code. After the particular implementation is selected, the program object is bound to the particular implementation by updating the assigned slot in the target cache with a pointer pointing to the particular implementation. When the program object is invoked during the execution of the program, the particular implementation of the program object to be executed is determined by looking-up the slot in the target cache assigned to the program object. The particular implementation is loaded into the execution sequence and executed.

Figure 1:
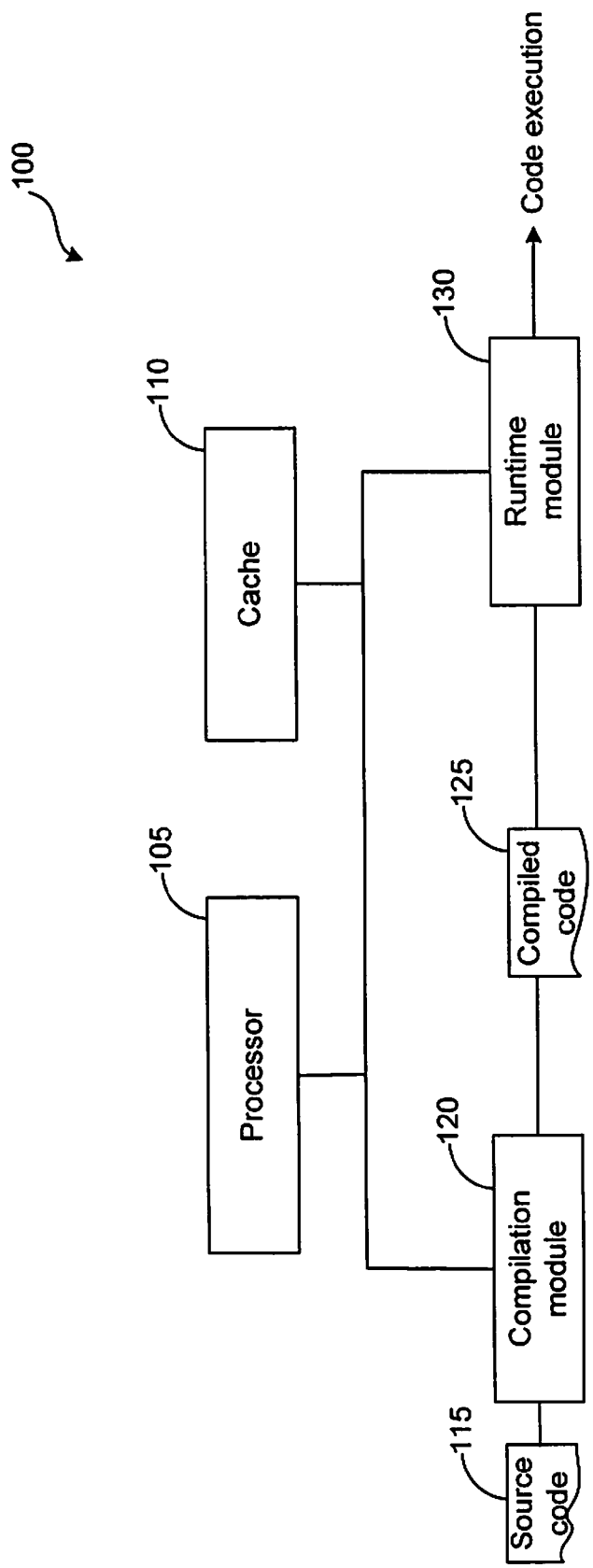
FIG. 1 is a distributed environment in which an embodiment of the invention may operate.

FIG. 1 is an environment in which an embodiment of the invention may operate. The environment 100 includes a processor 105, a cache 110, a compilation module 120 and a runtime module 130. The compilation module 120 compiles a source code 115 of a program into compiled code 125, and the runtime module 130 executes the source code 115 using the compiled code 125. The compilation module 120 and the runtime module 130 work in cooperation with the processor 105 to compile and execute the source code 115, respectively.

In an embodiment, the source code 115 is written, typed, or generated using a dynamic programming language, such as Personal Home Page or Hypertext Preprocessor (PHP). In another embodiment, the source code 115 may be written using other programming languages. In an embodiment, the compiled code 125 is a machine code executable by a processor, such as processor 105. In another embodiment, the compiled code 125 can include other format code which can be executed by the runtime module 130/processor 105.

Late binding is a feature in which a program object in the source code of a program is bound to an implementation of the program object during execution of the program. A program object includes programming language constructs, such as a class, a method, a variable, a constant, etc. Different programming languages have different programming language constructs. Accordingly, a type of the program object depends on the programming language of the source code.

The source code 115 may contain a number of program objects, and at least some of them may have a number of implementations. For example, a program object such as a method "doubleMyMoney($num)" may have more than one implementation. A first implementation of the method may return a value which is twice "$num," and a second implementation may return a value which is half of "$num." The method "doubleMyMoney($num)" may be bound to the first or second implementation based on the logic in the source code 115. Similarly a class "myClass" can have multiple definitions. In another example, a global variable "FOO" can have multiple definitions, such as "DEFINE ("FOO", 12)" or "DEFINE ("FOO", 21)."

The compilation module 120 and runtime module 130 may work in tandem to support binding a program object to its implementation. When the source code 115 is compiled, the compilation module 120 identifies the program objects in the source code 115 and assigns a slot in a data structure such as a target cache to each of the identified program objects. The target cache is composed of a plurality of contiguous slots of memory, and may be created in the cache 110. When the source code 115 is executed using the compiled code 125, the runtime module 130 binds the program object to its implementation by updating, during execution of the program and based on the execution flow in the program, the slot in the target cache with a pointer that points to the implementation of the program object. When the program object is invoked (for example, when the method is called in the program), the runtime module 130 obtains the implementation pointed to by the pointer in the assigned slot and executes the implementation.

In an embodiment, the compilation module 120 can be a just-in-time (JIT) compiler which compiles source code 115 to compiled code 125 at runtime but prior to execution of the source code 115. Further, the compilation module 120 can also include a generator for generating intermediate code, such as byte code, which is then compiled to the compiled code 125. The compilation module 120 and the runtime module 130 can be part of a single runtime environment, such as PHP runtime environment that can execute the source code 115 by either interpreting the byte code or executing the compiled code 125.

Although the diagram depicts components as functionally separate, such depiction is merely for illustrative purposes. It will be apparent to those skilled in the art that the components portrayed in this figure can be arbitrarily combined or divided into separate components. Further, each of the modules may run on the same machine or different multiple machines. For example, the source code 115 may be compiled by the compilation module 120 on one machine and may be run by the runtime module 130 on another machine.

Figure 3:
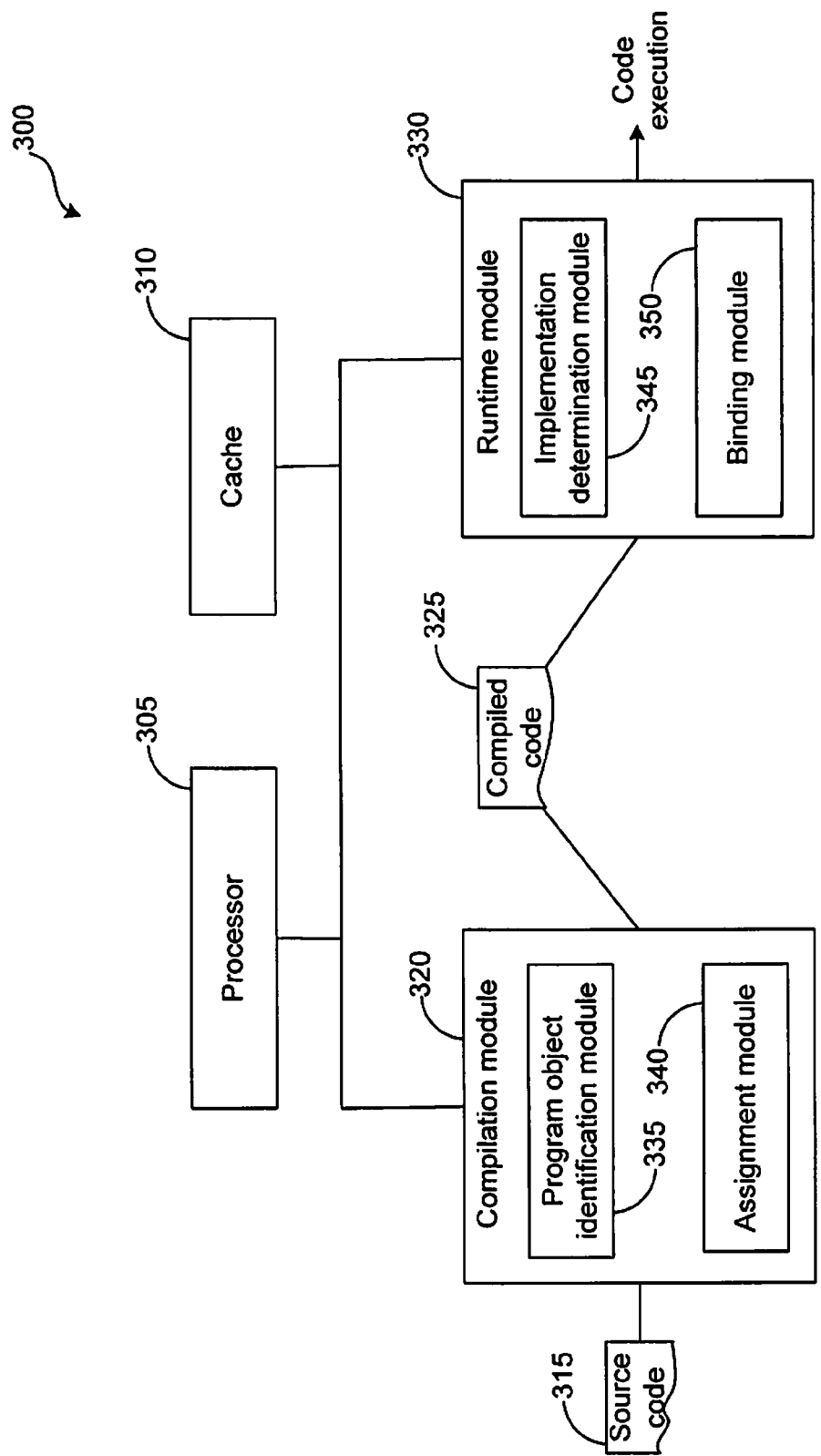
FIG. 3 is a block diagram illustrating a system for binding program objects to their implementations using caching techniques.
Figure 4:
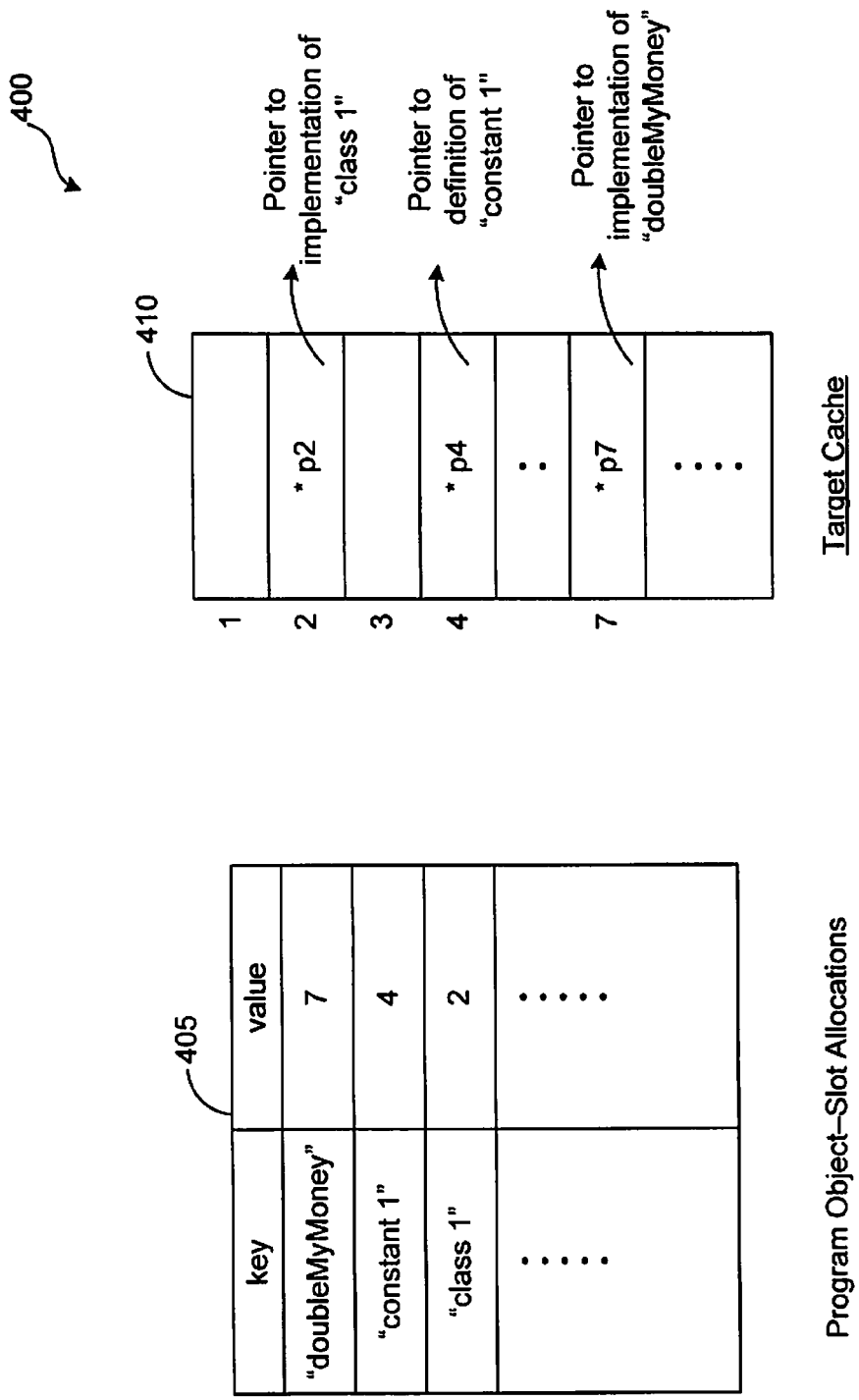
FIG. 4 illustrates an exemplary binding map that includes a data structure for storing program object-cache slot assignments, and a cache slot table for storing pointers to implementations of the program objects.

FIGS. 2-4 in association with the following paragraphs describe binding program objects to their implementations using caching techniques. FIG. 2 illustrates an example source code 200 written using PHP, according to an embodiment of the disclosed technique. In another embodiment, the source code 200 can be written using other programming languages. The source code 200 can be a portion of a program. The source code 200 includes a program object such as a method "doubleMyMoney($num)" which has two implementations, namely, a first implementation 205 that returns a value twice "$num" and a second implementation 210 that returns a value half of "$num." In another embodiment, the source code 200 may have other program objects such as global variables, global constants, etc. Although the figure illustrates only one program object such as method "doubleMyMoney($num)," the disclosed binding techniques are applicable to a number of other program objects.

In an embodiment, a compiler cannot determine which of the two implementations is executed when the method call 215 is executed. A runtime module which executes the source code 200 determines, during the execution of the source code 200 and based on the value returned by "isItMyLuckyDay( )," which of the two implementations is executed, and binds the determined implementation to the method "doubleMyMoney".

FIG. 3 is a block diagram illustrating a system 300 for binding program objects to their implementations using caching techniques, according to an embodiment of the disclosed technique. In an embodiment, the system 300 may be similar to environment 100 of FIG. 1. The source code 315 can be similar to source code 200 of FIG. 2. The compilation module 320 compiles the source code 315 to compiled code 325, such as machine code executable by processor 305. In another embodiment, the compiled code 325 can be of other formats that are executable by the processor 305/runtime module 330. The runtime module 330 executes the source code 315 using the compiled code 325.

During the compilation phase, a program object identification module 335, working in co-operation with the compilation module 320, identifies the program objects in the source code 200. An assignment module 340, working in co-operation with the compilation module 320, assigns a slot in a target cache data structure for each of the identified program objects. The target cache data structure may be created in the cache 310. The slot assignments are stored in a data structure such as hashtable 405 of FIG. 4. The name of the program object is stored as a key and the target cache slot assigned to the program object is stored as a value of the key in the hashtable 405. For example, if the method "doubleMyMoney" of source code 200 is assigned slot number "7" in the target cache, the slot assignment entry for the method has "doubleMyMoney" as key and target cache slot "7" as the value in the hashtable 405. The hashtable 405 is compiled and further included in the compiled code 325. The slot assignments may also be stored in other data structures.

In an embodiment, the source code 200 may be converted to an intermediate format, such as byte code, which is then compiled to compiled code 325. The conversion from source code to byte code may be performed by the compilation module 320 or may be performed by another independent module (not shown). If the source code is converted to the byte code, the hashtable 405 for the slot assignments may also be converted to the byte code. The compilation module 320 may then compile the hashtable 405 along with the other byte code.

The runtime module 330 binds the method "doubleMyMoney" to one of the two implementations, namely, first implementation 205 and second implementation 210 as follows. On execution of the source code 200, when the control flow of the program arrives at the first line "IF (isItMyLuckyDay( ))" of the source code 200, the runtime module 330 determines the value of the method "isItMyLuckyDay( )." In an embodiment, the method "isItMyLuckyDay( )" can return a Boolean true or false value. If the value returned is true, the control flow enters the first implementation 205, and an implementation module 345 determines that the first implementation 205 should be bound to the method "doubleMyMoney."

A binding module 350 binds the method "doubleMyMoney" to the first implementation 205 by updating the target cache slot "7" with a pointer to the first implementation 205, as shown in the target cache 410 of FIG. 4. In an embodiment, the binding module 350 is aware, from the compiled code 325, that target cache slot "7" is assigned to the method "doubleMyMoney". Similarly, the method "doubleMyMoney" can be bound to the second implementation 210 by updating the target cache slot "7" with a pointer to the second implementation 210, if the method "isItMyLuckyDay( )" returns Boolean false.

Further, continuing with the execution of the source code 200, when the control flow arrives at the method call 215 which invokes the method "doubleMyMoney," the runtime module 330 loads the implementation bound to the method from the assigned target cache slot and executes the implementation.

The execution speed of the program is enhanced by (i) using a cache to perform the program object binding at runtime, and (ii) restricting the resource consuming hashtable operations to compile time. Further, the consumption of runtime computing resources is also reduced.

FIG. 4 illustrates an exemplary binding map 400 that includes program object-slot assignment table 405 and target cache 410, according to an embodiment of the disclosed technique. The program object-slot assignment table 405 indicates the cache slots assigned to program objects of source code 200. The target cache 410 stores pointers to implementations of program objects to which the cache slots are assigned. In an embodiment, the target cache 410 can be a binary large object (BLOB) in a memory (not shown) of system 300. The BLOB can have a predetermined base address in the memory and can be of a predetermined size. Each of the slots can be an offset from the base address of the BLOB. Further, the size of the BLOB may be adjusted dynamically based on the number of program objects in the source code 200. In an embodiment, the binding map 400 may have only one target cache 410 for the source code 200. In another embodiment, the binding map 400 may have a number of target cache data structures, for example, one for each type of a program object of the source code 200.

Figure 5:
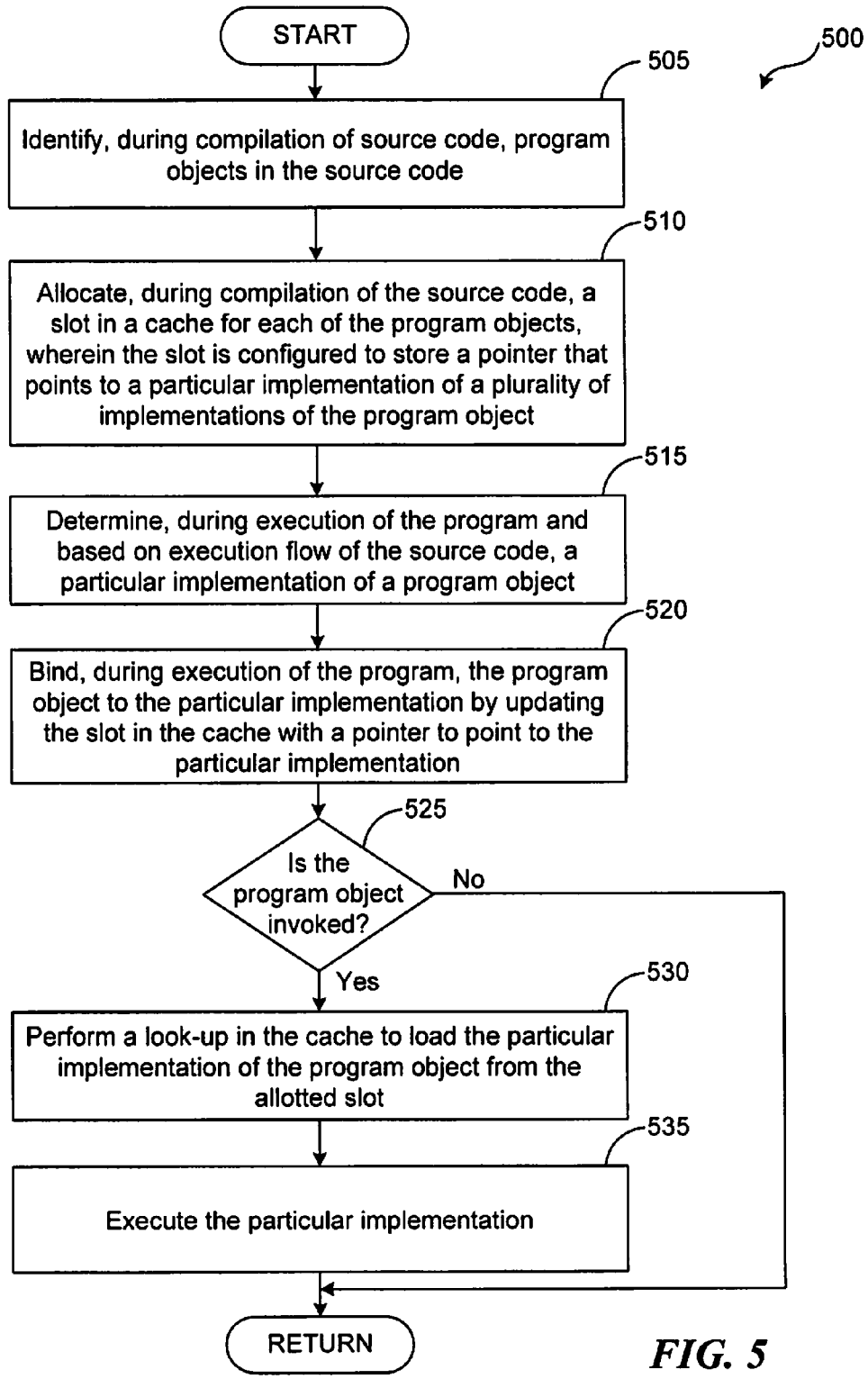
FIG. 5 is a flow diagram illustrating a process of binding program objects to their implementations using caching techniques.

FIG. 5 is a flow diagram of a process illustrating binding a program object to an implementation of the program object according to an embodiment of the disclosed technique. The process 500 may be executed in a system such as system 300 of FIG. 3. At step 505, the program object identification module 335 identifies the program objects in a source code of a program. A program object can have one or more implementations. At step 510, the assignment module 340 assigns a slot in a target cache to each of the identified program objects. The slot in the target cache is configured to store a pointer to one of a multiple implementations a program object to which the slot is assigned.

At step 515, the implementation determination module 345 determines a particular implementation of the program object based on the execution flow of the program. At step 520, the binding module 350 binds the program object to the particular implementation by updating, in a target cache, the assigned target cache slot with a pointer to the particular implementation.

At determination step 525, it is determined whether a program object is invoked. Responsive to a determination that the program object is invoked, at step 530, the runtime module 330 performs a look-up in the target cache to load the particular implementation of the program object from the assigned target cache slot into the execution sequence. At step 535, the runtime module 330 executes the particular implementation.

Referring back to steps 505 and 510, the identification of program objects, and allocation of slots in the target cache to the program objects are performed during compilation of the source code. The system 300 supports both ahead-of-time and JIT compilation. In ahead-of-time compilation, the source code is compiled before the code is executed, that is ahead of runtime. In other words, the compilation process and execution process are independent of each other. Whereas in JIT compilation, the source code is compiled at runtime prior to execution of the source code.

Still referring back to step 510, the slot assignments are stored in a data structure such as a hashtable or a hashmap. In an embodiment, the data structure is converted along with the source code to the compiled code. The data structure is stored as long as the compiled code exists, e.g., lifetime of the compiled code, and deleted when the compiled code is deleted.

Referring back to steps 515 and 520, determining the particular implementation of the program object, and binding the program object to the particular implementation is performed during execution of the source code. Also, the target cache used to obtain the implementation of a program object, is created for a particular thread of execution of the source code and therefore, is specific to the thread. In other words, a target cache created on one thread is not available to another thread of execution. A new target cache data structure is created for every thread of execution of the source code. Further, the target cache is reset or deleted at the beginning and/or end of the execution of the source code, e.g., when the thread executing the source code begins and/or terminates or when a session, such as a web request, executing the source code begins and/or terminates.

Figure 6:
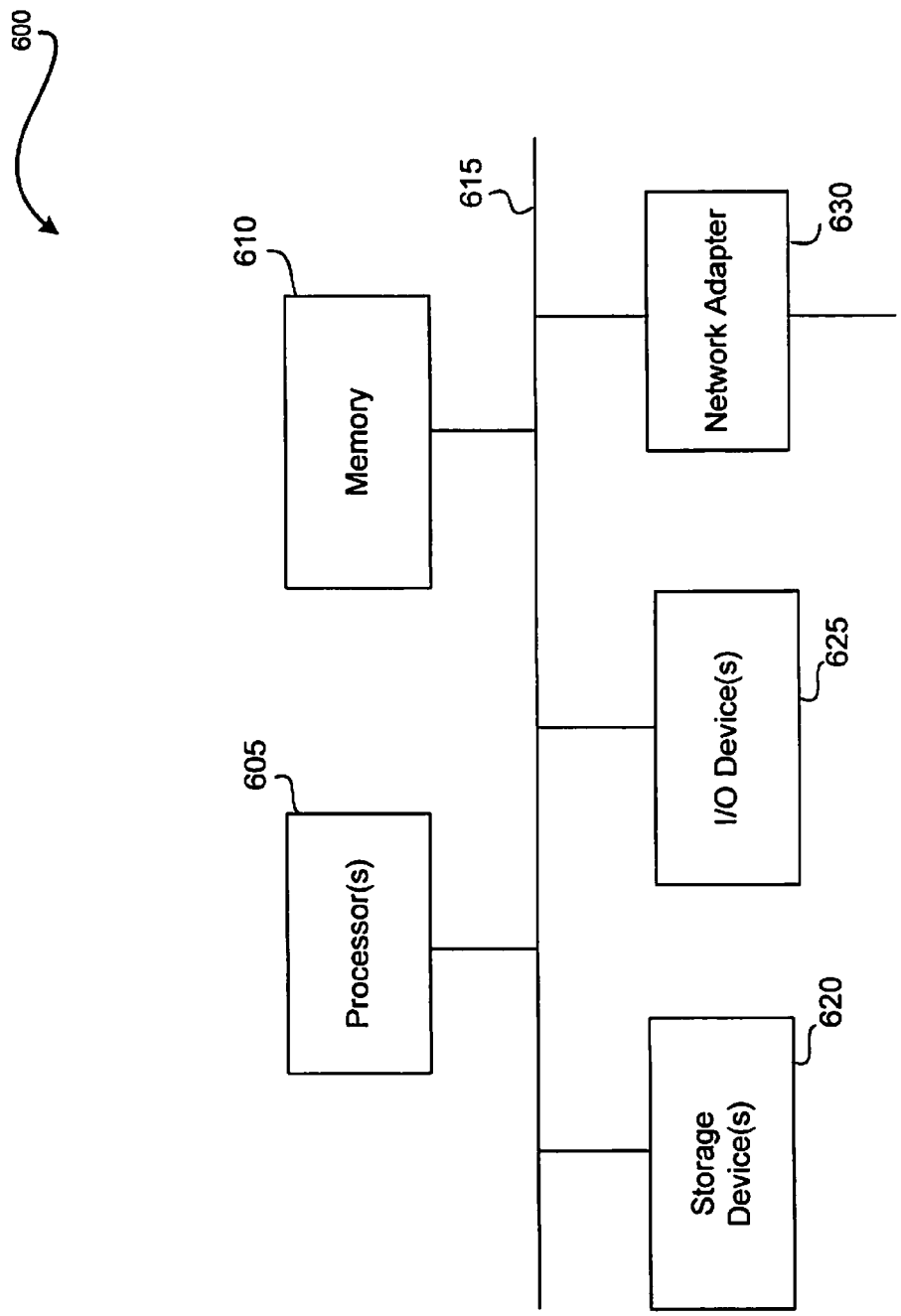
FIG. 6 is a block diagram of an apparatus that may perform various operations, and store various information generated and/or used by such operations.

FIG. 6 is a block diagram of an apparatus that may perform various operations, and store various information generated and/or used by such operations, according to an embodiment of the disclosed technique. The apparatus can represent any computer or processing system described herein. The processing system 600 is a hardware device on which any of the entities, components or services depicted in the examples of FIGS. 1-5 (and any other components described in this specification) can be implemented, such as a compilation module, runtime module, cache, BLOB, etc. The processing system 600 includes one or more processors 605 and memory 610 coupled to an interconnect 615. The interconnect 615 is shown in FIG. 6 as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 605 is/are the central processing unit (CPU) of the processing system 600 and, thus, control the overall operation of the processing system 600. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 610 is or includes the main memory of the processing system 600. The memory 610 represents any form of random access memory (RAM), read-only memory (ROM), flash memory, or the like, or a combination of such devices. In use, the memory 610 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 605 through the interconnect 615 are a network adapter 630, a storage device(s) 620 and I/O device(s) 625. The network adapter 630 provides the processing system 600 with the ability to communicate with remote devices, over a network and may be, for example, an Ethernet adapter or Fibre Channel adapter. The network adapter 630 may also provide the processing system 600 with the ability to communicate with other computers within the cluster. In some embodiments, the processing system 600 may use more than one network adapter to deal with the communications within and outside of the cluster separately.

The I/O device(s) 625 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 610 can be implemented as software and/or firmware to program the processor(s) 605 to carry out actions described above. In certain embodiments, such software or firmware may be initially provided to the processing system 600 by downloading it from a remote system through the processing system 600 (e.g., via network adapter 630).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (SIB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 620 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:
   identifying, at a computer system and during compilation of a source code of a program, a plurality of program objects in the source code, the source code conforming to a dynamic programming language;
   allocating, at the computer system and during compilation of the source code, a slot in a target cache for each of the program objects, wherein the slot is configured to store a pointer to a particular implementation of a plurality of implementations of a program object to which the slot is allotted, wherein the target cache is reset at beginning of execution of the program;

determining, during the execution of the program and based on execution flow of the program, the particular implementation of the program object; and binding, during execution of the program, the program object to the particular implementation by updating the allotted slot with the pointer to the particular implementation.

2. The method of claim 1 further comprising:

determining, during execution of the program, whether the program object is invoked;

responsive to a determination that the program object is invoked, loading the particular implementation of the program object from the allotted slot; and executing the particular implementation of the program object.

3. The method of claim 1, wherein allocating a slot in a target cache to each of the program objects includes:

storing allocations of the slots to program objects in a data structure.

4. The method of claim 3, wherein storing the allocations in the data structure includes:

storing the allocations as key-value pairs in the data structure, a name of the program object being a key and a slot allotted to the program object being a value of a key-value pair.

5. The method of claim 3, wherein the data structure includes at least one of a hashtable or a hashmap.

6. The method of claim 3, wherein storing the allocations in the data structure includes:

storing the allocations for a lifetime of a compiled code of the source code.

7. The method of claim 1, wherein the slots in the target cache are updated with the pointers to particular implementations of the program objects as and when the particular implementations occur during the execution of the program.

8. The method of claim 1, wherein the target cache is specific to a thread of the execution of the program.

9. The method of claim 1, wherein the program objects include at least one of (i) a class, (ii) a method, (iii) a variable, or (iv) a constant.

10. The method of claim 1, wherein a type of the program objects is dependent on programming language of the source code.

11. The method of claim 1, wherein the dynamic programming language of the source code includes Personal Home Page/Hypertext Preprocessor (PHP).

12. A method comprising:

determining, at a computer system and during execution of a source code, whether a program object of the source code is invoked, the program object having a plurality of implementations;

responsive to a determination that the program object is invoked, performing a look-up in a target cache of the computer system to obtain a particular implementation of the program object, the target cache having a plurality of slots, each of the slots assigned to each of a plurality of program objects of the source code, and each of the slots configured to store a pointer that points to the particular implementation of the program object to which the slot is assigned, wherein the target cache is reset at beginning of the execution of the source code; and executing the particular implementation of the program object.

13. The method of claim 12, wherein assigning the slots in the target cache to the program objects includes:

assigning the slots to the program objects during compilation of the source code.

14. The method of claim 12, wherein assigning the slots in the target cache to the program objects includes:

storing slot assignments in a data structure.

15. The method of claim 12, wherein performing a look-up in a target cache includes:

updating, during execution of the source code, the assigned slot with the pointer that points to the particular implementation of the program object to which the slot is assigned.

16. An apparatus comprising:

a processor;

a memory that contains instructions to be executed by the processor;

a program object identification module that works in cooperation with the processor to identify, during compilation of a source code of a program, a plurality of program objects in the source code;

an assignment module to assign, during compilation of the source code, a slot in a target cache to each of the program objects, wherein the slot is configured to store a pointer to a particular implementation of a plurality of implementations of a program object to which the slot is assigned, wherein the target cache is reset at beginning of execution of the program;

an implementation determination module to determine, during the execution of the program and based on execution flow of the program, the particular implementation of the program object; and a binding module to bind, during execution of the program, the program object to the particular implementation by updating the assigned slot with the pointer to the particular implementation.

17. The apparatus of claim 16 further comprising:

a compilation module to compile the source code to generate a compiled code.

18. The apparatus of claim 16 further comprising:

a runtime module to execute the source code.

19. The apparatus of claim 16, wherein the assignment module is further configured to create a data structure to store assignments of slots in the target cache to the program objects.

* * * * *